US006671351B2

(12) United States Patent
Menard et al.

(10) Patent No.: US 6,671,351 B2
(45) Date of Patent: Dec. 30, 2003

(54) ASSISTED PERSONAL COMMUNICATION SYSTEM AND METHOD

(75) Inventors: Raymond J. Menard, Hastings, MN (US); Curtis E. Quady, Burnsville, MN (US)

(73) Assignee: Royal Thoughts, L.L.C., Bloomington, MN (US)

( * ) Notice: Subject to any disclaimer, the term of this patent is extended or adjusted under 35 U.S.C. 154(b) by 29 days.

(21) Appl. No.: 09/767,375

(22) Filed: Jan. 22, 2001

(65) Prior Publication Data

US 2001/0026223 A1 Oct. 4, 2001

Related U.S. Application Data

(60) Provisional application No. 60/105,119, filed on Oct. 21, 1998.

(51) Int. Cl.[7] .............................................. H04M 11/00

(52) U.S. Cl. ........................................... 379/45; 379/38

(58) Field of Search ............................. 379/38, 37, 39, 379/40, 41, 42, 45, 46, 51; 455/404; 340/531, 532, 539, 540, 573.1, 573.4

(56) References Cited

U.S. PATENT DOCUMENTS

| | | | | |
|---|---|---|---|---|
| 3,843,841 | A | 10/1974 | Rubinstein | 179/5 P |
| 3,969,709 | A | 7/1976 | Isaacs et al. | 340/224 |
| 4,237,344 | A | 12/1980 | Moore | 179/2 A |
| 4,284,849 | A | 8/1981 | Anderson et al. | 179/5 R |
| 4,303,801 | A | 12/1981 | Anderson et al. | 179/5 R |
| 4,531,527 | A | 7/1985 | Reinhold, Jr. et al. | 128/696 |
| 4,772,876 | A | 9/1988 | Laud | 340/539 |
| 4,843,377 | A | 6/1989 | Fuller et al. | 340/573 |
| 4,856,047 | A | 8/1989 | Saunders | 379/57 |
| 4,908,600 | A | 3/1990 | Martinez | 340/310 R |
| 4,993,059 | A | 2/1991 | Smith et al. | 379/39 |
| 4,994,787 | A | 2/1991 | Kratt et al. | 340/505 |

(List continued on next page.)

OTHER PUBLICATIONS

*Skyroute Communications*, http://www.sur–gard.com/sky-route.htm, pp. 1–4, (1974).

"21st Century Emergency Safety Communication Policy", *ComCARE Alliance*, http://www.comcare.org/21ct99.htm, 3 pages, (2000).

"AlarmNet—A Original Alarmnet", *AlarmNet*, http;//www.ademco.com/AlarmNet/AlarmNetA.htm, pp. 1–2, (2000).

"AlarmNet—C Control Channel Cellular", *AlarmNet*, http://www.ademco.com/AlarmNet/AlarmNetC.htm, 2 pages, (2000).

"AlarmNet—M Mobitex System", *AlarmNet*, http://www.ademco.com/AlarmNet/AlarmNetM.htm, p. 1, (2000).

"allNetDevices:—Geoworks, Openware End Patent Fight", *allNetDevices*, http://www.devices.internet.com/icom_cgi/print/print.cgi?url=http://devices.in ternet.com/industry/ne . . . , 1 page, (2000).

"allNetDevices:—The Device–Centric Home in 2000: Close, But No Cigar", *allNetDevices*, http://www.devices-.internet.com, 3 pages, (2000).

"ARM7 Thumb Family", *Arm Powered*, Product Information, 4 p., (Prior to May 26, 200).

(List continued on next page.)

*Primary Examiner*—Stella Woo
(74) *Attorney, Agent, or Firm*—Schwegman, Lundberg, Woessner & Kluth, P.A.

(57) ABSTRACT

A personal communications system which may be used for a variety of emergency and non-emergency situations using two-way communication devices and a bidirectional communication network. In one application two-way pagers are adapted for use in the system. In one application cellular devices are adapted for use in the system. In one application an assisted living response center is established using various embodiments of the present personal communications system. The system provides multiple levels of prioritization. One embodiment provides a method for receiving, evaluating and responding to calls received from a subscriber.

28 Claims, 3 Drawing Sheets

U.S. PATENT DOCUMENTS

| | | | | | |
|---|---|---|---|---|---|
| 5,016,172 | A | | 5/1991 | Dessertine | 364/413.02 |
| 5,025,374 | A | | 6/1991 | Roizen et al. | 364/413.02 |
| 5,062,147 | A | | 10/1991 | Pickett et al. | 364/900 |
| 5,081,667 | A | | 1/1992 | Drori et al. | 379/59 |
| 5,128,979 | A | | 7/1992 | Reich et al. | 379/40 |
| 5,195,126 | A | * | 3/1993 | Carrier et al. | 379/45 |
| 5,223,844 | A | | 6/1993 | Mansell et al. | 342/357 |
| 5,228,449 | A | | 7/1993 | Christ et al. | 128/691 |
| 5,276,728 | A | | 1/1994 | Pagliaroli et al. | 379/58 |
| 5,278,539 | A | | 1/1994 | Lauterbach et al. | 340/539 |
| 5,319,355 | A | | 6/1994 | Russek | 340/573 |
| 5,319,698 | A | | 6/1994 | Glidewell et al. | 379/39 |
| 5,333,173 | A | * | 7/1994 | Seazholtz et al. | 379/38 |
| 5,351,235 | A | | 9/1994 | Lahtinen | 370/58.1 |
| 5,390,238 | A | | 2/1995 | Kirk et al. | 379/93 |
| 5,398,782 | A | | 3/1995 | Talbot et al. | 187/393 |
| 5,402,466 | A | | 3/1995 | Delahanty | 379/44 |
| 5,404,577 | A | | 4/1995 | Zuckerman et al. | 455/66 |
| 5,412,372 | A | | 5/1995 | Parkhurst et al. | 340/568 |
| 5,416,695 | A | | 5/1995 | Stutman et al. | 364/413.02 |
| 5,432,841 | A | | 7/1995 | Rimer | 379/59 |
| 5,451,839 | A | | 9/1995 | Rappaport et al. | 375/224 |
| 5,485,504 | A | | 1/1996 | Ohnsorge | 379/58 |
| 5,486,812 | A | | 1/1996 | Todd | 340/539 |
| 5,513,111 | A | | 4/1996 | Wortham | 364/460 |
| 5,568,535 | A | | 10/1996 | Sheffer et al. | 379/39 |
| 5,570,083 | A | | 10/1996 | Johnson | 340/692 |
| 5,583,831 | A | | 12/1996 | Churchill et al. | 368/10 |
| 5,587,701 | A | | 12/1996 | Hess | 340/541 |
| 5,630,207 | A | | 5/1997 | Gitlin et al. | 455/54.1 |
| 5,640,147 | A | * | 6/1997 | Chek et al. | 379/38 |
| 5,652,564 | A | | 7/1997 | Winbush | 340/426 |
| 5,687,215 | A | | 11/1997 | Timm et al. | 379/58 |
| 5,712,619 | A | * | 1/1998 | Simkin | 379/38 |
| 5,719,551 | A | | 2/1998 | Flick | 340/426 |
| 5,736,932 | A | | 4/1998 | Bulfer et al. | 340/825.34 |
| 5,739,748 | A | | 4/1998 | Flick | 340/426 |
| 5,742,233 | A | * | 4/1998 | Hoffman et al. | 379/38 |
| 5,752,976 | A | | 5/1998 | Duffin et al. | 607/32 |
| 5,754,111 | A | * | 5/1998 | Garcia | 379/38 |
| 5,777,551 | A | | 7/1998 | Hess | 340/541 |
| 5,784,685 | A | | 7/1998 | Stanford et al. | 455/31.2 |
| 5,786,746 | A | | 7/1998 | Lombardo et al. | 340/286.07 |
| 5,793,283 | A | | 8/1998 | Davis | 340/426 |
| 5,812,536 | A | | 9/1998 | Manduely | 370/282 |
| 5,815,417 | A | | 9/1998 | Orr et al. | 364/578 |
| 5,821,854 | A | | 10/1998 | Dorinski et al. | 340/539 |
| 5,825,283 | A | | 10/1998 | Camhi | 340/438 |
| 5,845,203 | A | | 12/1998 | LaDue | 455/414 |
| 5,850,180 | A | | 12/1998 | Hess | 340/541 |
| 5,850,344 | A | | 12/1998 | Conkright | 364/479.01 |
| 5,852,408 | A | * | 12/1998 | Christiansen et al. | 379/38 |
| H1782 | H | | 2/1999 | Wicks et al. | 340/825.44 |
| 5,870,020 | A | | 2/1999 | Harrison, Jr. | 340/426 |
| 5,873,043 | A | | 2/1999 | Comer | 455/458 |
| 5,874,889 | A | | 2/1999 | Higdon et al. | 340/426 |
| 5,892,442 | A | | 4/1999 | Ozery | 340/539 |
| 5,894,591 | A | * | 4/1999 | Tamayo | 379/38 |
| 5,898,391 | A | | 4/1999 | Jefferies et al. | 340/988 |
| 5,898,904 | A | | 4/1999 | Wang | 455/31.3 |
| 5,902,234 | A | | 5/1999 | Webb | 600/300 |
| 5,907,279 | A | | 5/1999 | Bruins et al. | 340/506 |
| 5,917,405 | A | | 6/1999 | Joao | 340/426 |
| 5,933,080 | A | | 8/1999 | Nojima | 340/539 |
| 5,959,529 | A | | 9/1999 | Kail, IV | 340/539 |
| 6,023,223 | A | | 2/2000 | Baxter, Jr. | 340/531 |
| 6,023,241 | A | | 2/2000 | Clapper | 342/357.13 |
| 6,028,514 | A | | 2/2000 | Lemelson et al. | 340/539 |
| 6,035,021 | A | | 3/2000 | Katz | 379/93.12 |
| 6,035,217 | A | * | 3/2000 | Kravitz | 455/561 |
| 6,044,257 | A | * | 3/2000 | Boling et al. | 455/404 |
| 6,057,758 | A | | 5/2000 | Dempsey et al. | 340/539 |
| 6,087,952 | A | | 7/2000 | Prabhakaran | 340/693.5 |
| 6,118,866 | A | | 9/2000 | Shtivelman | 379/309 |
| 6,288,641 | B1 | * | 9/2001 | Casais | 379/37 |
| 6,295,346 | B1 | * | 9/2001 | Markowitz et al. | 379/45 |
| 6,340,928 | B1 | * | 1/2002 | McCurdy | 340/436 |
| 6,388,612 | B1 | * | 5/2002 | Neher | 370/312 |
| 6,442,241 | B1 | | 8/2002 | Tsumpes | 379/45 |

OTHER PUBLICATIONS

"ARM9 Thumb Family", *Arm Ltd.*, Product Information, 6 pages, (Prior to May 26, 2000).

"Automatic Crash Notification", *ComCARE Alliance*, http://www.comcare.org/overview.htm, 2 pages, (2000).

"Blue–Connect", *Acer NeWeb Corporation*, Product Brief, 1 page, (Prior to May 26, 2000).

"Blue–Share", *Acer NeWeb Corporation*, Product Brief, 1 page, (Prior to May 26, 2000).

"Bluetooth—solutions for personal area networking", *TDK Systems, Inc.*, Manufactures Brochure, 4 pages, (Prior to May 26, 2000).

"Bluetooth Development using SDL, MSC and TTCN", *Teleogic AB*, Product Information, 13 pages, (Prior to May 26, 2000).

"Bluetooth Product Design—a natural progressionof our existing buiness", *RTX*, Manufactures Brochure, 4 pages, (Prior to May 26, 2000).

"Bluetooth White Paper", *AU–System AB*, Entire Pamphlet, (1999).

"Connect 24 Data Communications", *Connect 24*, http://www.connect24.com, 1 page, (2001).

"CreataLink", *Motorola, Inc.*, 2 pages, (1999).

"CreataLink 2XT", *Motorola*, http://www.motorola.com/MIMS/MSPG/Products/OEM/calxt, 1 page, (Mar. 1999).

"CreataLink 2XT", *Motorola Messaging Products*, www-.mot.com/MIMS/MSPG/Products/OEM/calxt/, 1 p., (Mar. 1999).

"Designing Solutions for the Internet Economy", *Intel Developer Forum Spring 2000*, Program Brochure, 2 pages, (Feb. 15–17, 2000).

"Digianswer Bluetooth—Development and Demonstration Tools", *DIGIANSWER A/S*, Product Sheet, 6 pages, (Prior to May 26, 2000).

"DIGIANSWER/Bluetooth Technology", *Digainswer (Irl) Ltd.*, Product Inforamtion, 8 pages, (Prior to May 26, 2000).

"Emergency 911 Cellular Phone and Cellular Phone Accessories", *AAA Communications*, http://web.idirect.com/aaa/, 1–7 pages, (2001).

"Emergency Terms", *Glossary*, http://www.comcare.org/glossary.htm, 3 pages, (2000).

"Empowering the mobile enterprise", *Puma Technology, Inc.*, Manufactures Brochure, 2 pages, (1996–1999).

"Emulation System Speeds Development of CDMA Satcom Handsets", *Penton Publishing, inc.*, Product Information, 4 pages, (1997).

"Enabling Innovation", *Arm Ltd.*, Product Brochure, 10 pages, (1999).

"Get a better vantage point and outmaneuver the competition", *Cadence Design Systems, Inc.*, Manufactures Brochure, 2 pages, (1999).

"Introduction to the HomeRF Technical Specification", *HomeRF*, pp. 1–17, (2000).

"IVT—Bluetooth Protocol Stack SDL/C Source Code", *Bluthtooth*, Product Brochure, 2 pages, (Prior to May 26, 2000).

"Lucent Technologies and Bluetooth", *Lucent Technologies, Inc.*, Manufactures Brochure, 2 pages, (Dec. 1999).

"ObjectGEODE—The Most Advanced Integrated Enviornment for the Development of Distributed Real–time Systems", *VERILOG S.A.*, Entire Brochure, (1998).

"ORA Electronics Introduces Rescue Mate, a Complete Cellular Telephone Safety Package; Hands–Free Operation, Instant Emergency 911 Access, Roadside Assistance Services", *Business Wire*, http://www.findarticles.com, 2 pages, (1998).

"OSE—the new generation realtime operating system", *ENA OSE Systems*, Informational Brochure, Entire booklet, (1999).

"PSAP Updates and Third–Party Call Centers", *ComCARE Alliance*, http://www.comcare.org/psap.htm, 2 pages, (2000).

"Samsung Electronics joins home radio frequency group in development of wireless network for the home", *Samsung Electronics*, http://www.samsung.com/news/samsung/1998/sea0305.html, pp. 1–2, (1998).

"Socket's Bluetooth Cordless Communications Card FAQ", *Socket Communications, Inc.*, Informational Literature, 2 pages, (Dec. 1999).

"Spontaneous Connections", *CommVerge*, 6 pages, (May 2000).

"Tachless Remote Engine Starters", *Almex*, http://www.almexltd.com/iei/mantis1200.htm, pp. 1–3, (2000).

"Technology Solutions for Bluetooth from Ericsson Microelectronics", *Erricson Components AB*, Manufactures Brochure, 2 pages, (Nov. 1999).

"The Ericsson Bluetooth Developement Kit—Faster launching of Bluetooth Products", *Ericsson Mobile Communications, AB*, Manufactures Brochure, 2 pages, (1999).

"The Secret of Success!", *SIGnal Newsletter—The Official Newsletter of the Bluetooth Special Interest Group*, Issue No. 3, 8 pages, (Nov. 1999).

"UMTS W–DCMA Technology Development Using the Aptix System Explorer MP4 for Algorithm Verification", *Aptix Corporation*, Product Information, 4 pages, (1999).

"Unleash the World—Core technology for Bluetooth applications", *Ericsson Mobile Communications AB*, Manufactures Brochure, 8 pages, (1999).

"Will the push—not pull—of Internet information dramatically alter out Web interactions", *Sunworld*, http://www.sunworld.com, 6 pages, (2000).

"Wireless Connections Made Easy", *Bluetooth*, Manufactures Brochure, 19 pages, (Prior to May 26, 2000).

"Your Vision —Our Solution", *RTX Telcom*, Manufacture Brochure, 6 pages, (Prior to May 26, 2000).

Houston, J., "Socket Teams with Cambridge Silicon Radio for Bluetooth Cordless Networking on Windows CE", *Socket Communications, Inc.*, Press Release, 2 pages, (1999).

Nobel, C., "Microsoft jumps on the Bluetooth bandwagon", *PC Week*, 1 page, (Dec. 6, 1999).

Posti, J., "Motorola Introduces CreataLink 2 XT ReFLEX Two–way Data Transceiver for Wireless Communications", *Motorola Press Release*, www.mot.com/MIMS/MSPG/Press/PRI9990303_21575.html, 2 p., (Mar. 1999).

* cited by examiner

ASSISTED PERSONAL COMMUNICATION SYSTEM AND METHOD

CROSS-REFERENCE TO RELATED APPLICATIONS

This application claims priority to U.S. patent application Ser. No. 09/277,805, filed Mar. 3, 1999, which claims priority to U.S. Provisional Patent Application Ser. No. 60/105,119, filed on Oct. 21, 1998, each of which is incorporated herein by reference.

TECHNICAL FIELD

The present invention relates generally to personal communication systems and in particular to a personal communication system suitable for use with children, vulnerable adults (such as those in assisted living situations) and others.

BACKGROUND

Personal communication systems have been proposed for emergency call systems to alert others to an emergency. One approach includes the emergency telephone number "911" and a caller using a standard telephone. Operators receiving the 911 telephone call are trained to assess emergency situations and dispatch emergency aid. Provided that the caller present a genuine emergency, this system is often effective.

However, some people are unable to take the steps needed to place an emergency telephone call. For example, a caller may be incapable of physically manipulating the numbered buttons on a telephone keypad. Children, vulnerable adults, and others with physical or mental disabilities may find it difficult, or impossible to dial a telephone number.

For some people, the challenge is not in the physical task of dialing, but rather, in determining if the situation truly presents an emergency. Immaturity or a lack of logical reasoning ability, may make it difficult for some to decide if an emergency call is needed. The person may needlessly call 911, or more dangerously, they may not call when assistance is actually needed. For some, calling a stranger for help may be too intimidating to contemplate. Other reasons may compel a person to avoid placing a 911 telephone call.

The rising number of unsupervised children has presented an additional set of problems for parents, educators and health care professionals. Unsupervised children, often referred to as latch-key kids, are typically a byproduct of households with two working parents. The parent's schedule is often longer than the school schedule of the children and consequently, many children are unsupervised until a parent has returned home from work. During the period where no parent is immediately accessible, problems can arise when these children find themselves in situations requiring adult advice or assistance. For example, many children lack the maturity to discern genuine emergencies from ordinary urgencies. Reluctance to call for emergency aid, and possibly face undesirable consequences, compels many children to take a course of inaction. In the event of a true emergency, such behavior can endanger themselves or others.

What is needed in the art is a system for providing assistance tailored to the needs of a child, vulnerable adult, or other person that may be presented with an emergency situation.

SUMMARY

The present subject matter provides a system and method to address the aforementioned problems and others not expressly stated in this detailed description. In one embodiment, an assisted personal communication system, including a two way pager or other bidirectional, long range, communication device, is used in conjunction with a response agency to coordinate a request for assistance by a user. In one embodiment, the system is used for children to report an emergency, or other situation, and to coordinate assistance efforts by the response agency.

One embodiment provides a method and includes receiving a request for assistance. The request is for the benefit of a monitored person at a remote location relative to the place where the message is received. The request may have any of several levels of urgency. The method includes classifying the urgency of the message based on information received with the request. If the urgency of the request is of a first classification, (such as for example, and not by way of limitation, low urgency) then attempting to establish bidirectional communication with a first contact selected from a plurality of contacts for the monitored person. If the urgency of the request is of a first classification, and if the attempt to establish bidirectional communication with the first contact is unsuccessful, then repeating the attempt with a second contact. If the attempt with the second contact is also unsuccessful, then contacting a public safety answering point. A public safety answering point may be reached in many communities by dialing 911. If the urgency of the request is of a second classification (such as for example, and not by way of limitation, a high urgency) then contacting the public safety answering point.

The request for assistance may include receiving a telephone call from the monitored person or from another person or device. The request may be received from a security system or a sensor. The request may include location information for the monitored person. Location information may include geographical coordinates, such as those from a global positioning system. Classifying the urgency of the request may include classification as an emergency. Attempting to establish bidirectional communication may include originating a telephone call, a cellular telephone call, transmitting a wireless signal, or transmitting a pager signal.

One method of the present invention includes receiving a plurality of contact numbers for each of a plurality of dependents. Each dependent is located at a different place and each contact number is associated with an authority for a dependent. The method also includes receiving a message of benefit to a particular dependent. The message is received at a location remote from the particular dependent. The method includes determining if the message is of a low priority, and if so, then attempting to obtain instructions using a contact number selected from the plurality of contact numbers for the particular dependent. If unable to obtain instructions, then reporting the message to a public safety answering point, and if the message is not of a low priority, then reporting the message to a public safety answering point.

A variation entails establishing bidirectional communication with the particular dependent. Also, receiving a plurality of contact numbers may include receiving telephone numbers. For one dependent, there may be a first contact number for a first authority and a second contact number for a second authority. Receiving a message of benefit to a particular dependent may include receiving an alarm signal or a telephone call. Determining if the message is of a low priority may include decoding the message or communicating with the particular dependent. Attempting to obtain instructions may include attempting to establish bidirectional communication using a contact number and it may include attempting to delegate responsibility.

In one embodiment, the system uses existing communication systems and communications protocols adapted to communicate requests and information to the response agency. In one embodiment, the system uses modified two way pagers adapted for easy activation in the event of an emergency situation. In one embodiment, the two way pagers are adapted for providing information to coordinate rescue or emergency aid dispatch. In one embodiment, when the emergency help button(s) on the device is pushed, the device transmits a call for help to a responding agency. The responding agency coordinates assistance to a predetermined location, such as a person's home or place of business. In one embodiment, the response agency receives global position information and coordinates help to that location.

Global position information may be derived from a number of different sources. For example, in one embodiment, position information is derived from a global position system (GPS) module in communication with the device of the present system. The GPS module may be internal or external to the device. In one embodiment, position information may be derived from other information systems, such as LORAN or other navigational technology.

In one embodiment the device has messages transmitted to it notifying the user of various "conditions." Such conditions may include information about circumstances, events, and/or situations for assisting the user. Using one embodiment of the present system, the user is able to acknowledge and respond accordingly to these messages. For example, these messages can indicate conditions such as "test", "medication reminder" or "is everything OK?". These messages can be automatically generated by the messaging automation system and the acknowledgments automatically processed or they can be manually generated and processed.

This summary is intended to provide a brief overview of some of the embodiments of the present system, and is not intended in an exclusive or exhaustive sense, and the scope of the invention is to be determined by the attached claims and their equivalents.

Other methods and systems are possible, as will be more fully described below.

DETAILED DESCRIPTION

This detailed description provides a number of different embodiments of the present system. The embodiments provided herein are not intended in an exclusive or limited sense, and variations may exist in organization, dimension, hardware, software, mechanical design and configuration without departing from the claimed invention, the scope of which is provided by the attached claims and equivalents thereof.

Figure 1:
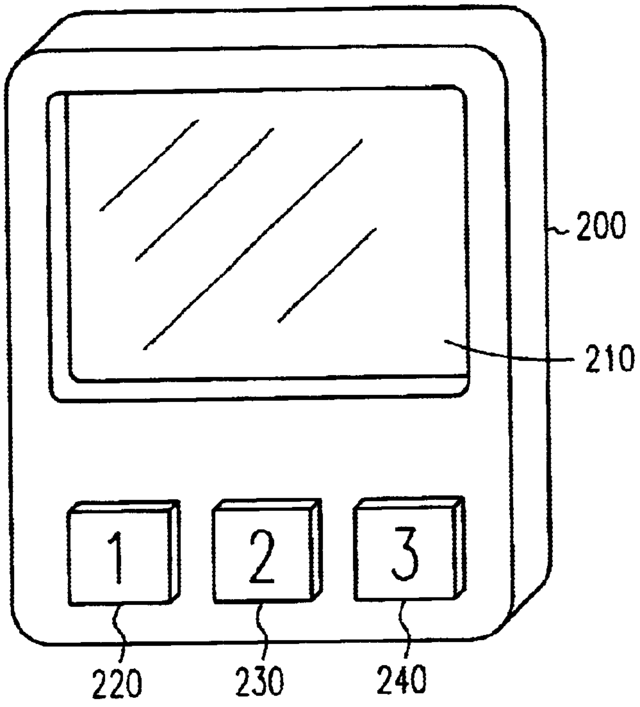
FIG. 1 is an isometric view of one embodiment of the present system.

FIG. 1 depicts an isometric view of one embodiment of the present system. Device 200 includes display 210, and buttons 220, 230 and 240, marked "1," "2," and "3," respectively. Other legends for the buttons are also contemplated, including, for example, descriptive words, icons or colors. In one embodiment, device 200 is a two way pager device. The buttons may be implemented in the form of hardware switches, such as mechanical buttons, or software, such as touch sensitive regions of a display.

In various embodiments, device 200 may be a cellular telephone, a personal data (or digital) assistant (commonly known as a PDA), or other battery operated, portable transceiver device. In one embodiment, device 200 comprises a wireless transceiver for transmitting and receiving digital data. Device 200 may include a long range transceiver. However, device 200 may comprise a short range transceiver provided that the monitoring service (or response agency or assessment service) is sufficiently close, or provided that repeater technology is available to extend the range of device 200 sufficiently to enable communications with the monitoring service. Suitable repeater technology may include additional transceivers positioned intermediate to device 200 and the monitoring service, or it may include other means of communicating, such as a wired communication network (for example, the public switched telephone network, also known as "PSTN"), fiber network or a satellite communications network.

In one embodiment, device 200 is powered by metered electric service and rigidly mounted to a surface. Such an embodiment may include a device mounted near a stationary telephone. In one embodiment, device 200 is coupled to a nearby telephone, either by wired or wireless technology.

In one embodiment, the system employs BLUETOOTH® technology to communicate requests and information. BLUETOOTH® is a registered trademark of Telefonaktiebolaget LM Ericsson of Stockholm, Sweden. "BLUETOOTH®" refers to short range communication technology developed by an industry consortium known as the BLUETOOTH® Special Interest Group. BLUETOOTH® operates at a frequency of approximately 2.45 GHz, utilizes a frequency hopping (on a plurality of frequencies), spread spectrum scheme, and provides a digital data transfer rate of approximately 1 Mb/second. In one embodiment, the present system includes a transceiver in compliance with BLUETOOTH® technical specification version 1.0, herein incorporated by reference. In one embodiment, the present system includes a transceiver in compliance with standards established, or anticipated to be established, by the Institute of Electrical and Electronics Engineers, Inc., (IEEE). The IEEE 802.15 WPAN standard is anticipated to include the technology developed by the BLUETOOTH® Special Interest Group. WPAN refers to Wireless Personal Area Networks. The IEEE 802.15 WPAN standard is expected to define a standard for wireless communications within a personal operating space (POS) which encircles a person. In one embodiment, the transceiver is a wireless, bidirectional, transceiver suitable for short range, omnidirectional communication that allows ad hoc networking of multiple transceivers for purposes of extending the effective range of communication. Ad hoc networking refers to the ability of one transceiver to automatically detect and establish a digital communication link with another transceiver. The resulting network, known as a piconet, enables each transceiver to exchange digital data with the other transceiver. According to one embodiment, BLUETOOTH® involves a wireless transceiver transmitting a digital signal and periodically monitoring a radio frequency for an incoming digital message encoded in a network protocol. The transceiver communicates digital data in the network protocol upon receiving an incoming digital message.

In one embodiment, the system employs CELLEMETRY® technology to communicate requests and information. CELLEMETRY® is a registered trademark of CELLEMETRY LLC of Atlanta, Ga., USA, and enables digital communications over a cellular telephone control channel.

In one embodiment of the present system, the buttons of device 200 are adapted to send messages to a monitoring service. For example, button 220 may be encoded with a general request for help, button 240 may be encoded with a request for immediate emergency services, and button 230 may be encoded such that an operator understands that further analysis of the situation is required before initiating a suitable response. The operator, in one embodiment, is a computer program running on a processor. The computer program may be intelligent and it may include voice recognition technology or speech synthesis technology to enable interaction with a caller or user. In one embodiment, the operator is a human operator. The operator, in one embodiment, exercises judgement or discretion in determining the needs of the caller or user. Discretion may result in repeatedly attempting to contact a particular selected contact using various numbers. Discretion may result in selecting one particular contact rather than another contact as a function of the information received by the operator from the user.

In FIG. 1, device 200 is a portable device that provide two way communications with a monitor service or other such service. In one embodiment, device 200 is sufficient to enable a user to conduct two way communications without the need for additional communication devices or networks.

In one embodiment, actuation of a button of device 200 operates to establish a communication channel with a monitor service or other service. For example, in one embodiment, actuation of a button on device 200 signals a monitor service and provides notification that a user is in need of aid. Upon receiving notification, one embodiment provides that the monitor service initiates a call to a particular number in an attempt to assist the caller. Such a particular number may be the home telephone number, a cellular telephone number or a two way pager telephone number of the user.

Figure 2:
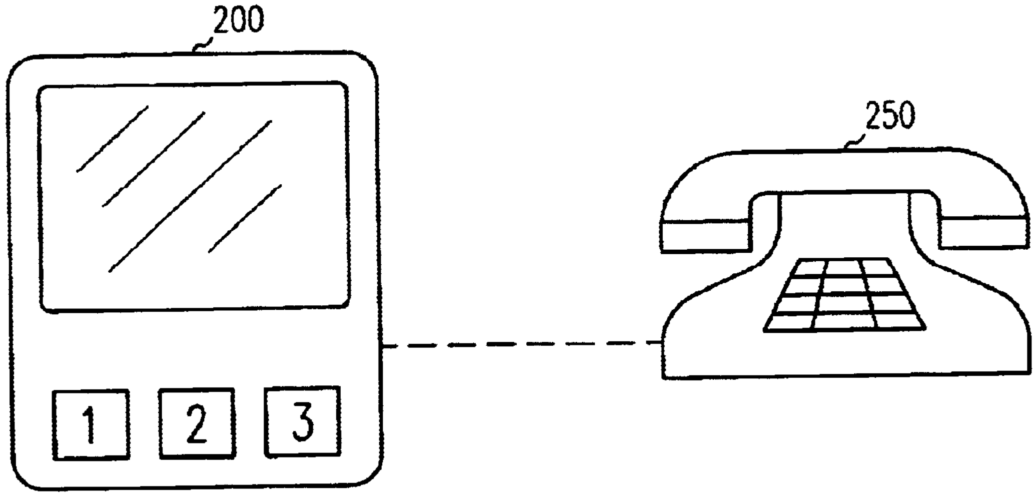
FIG. 2 is a view of one embodiment of the present system including a wireless device and a telephone.

FIG. 2 depicts an embodiment of the present system wherein device 200 is operated in conjunction with a discrete telephone. In this embodiment, the device operates to send a message to the monitor service and includes information as to which button the user had actuated. Having received the notification message, the monitor service proceeds to provide services in accordance with instructions received from a system administrator. An example of a set of instructions are described with respect to FIGS. 3, 4 and 5.

In one embodiment of the present system, more than three buttons are provided and each button is associated with a different meaning. For example, one embodiment is fitted with four buttons, corresponding to (1) a general request for help; (2) a police emergency; (3) a fire emergency; and (4) a medical emergency. In one embodiment, fewer than three buttons are provided. For example, one embodiment is fitted with two buttons, corresponding to (1) a general request for help; and (2) an emergency.

Device 200 may be used by children, in particular, latchkey children, or others needing supervisory services. For example, elderly persons in need of assistance may find the present technology beneficial. Use of the system should be limited to those capable of understanding, in a general sense, the meaning associated with each of the buttons.

In one embodiment, display 210 provides visual information to the user. Device 200 may also provide audible or tactile information to the user. In one embodiment, display 210 provides feedback to the user indicating success, or failure, of a transmission. In one embodiment, display 210 provides further instructions to the user.

Buttons 220, 230 and 240 provide easy-to-use means of communicating with the monitoring service. Suitable programming or hardware, implemented internally within device 200, associates particular functions with each of the buttons. For example, in one embodiment, actuation of button 200, marked "1," causes device 200 to transmit a particular signal corresponding to a request to speak to a guardian. The guardian may be a parent, a grandparent, a sibling, friend, or other responsible person. In the case of an elderly person, the guardian may be an adult child. Preferably, the guardian is one that the user will feel comfortable speaking with and to whom most questions, of a general or specific nature, can be addressed. Suitable questions of a general nature may include a request by the child to engage in a particular activity or attend a particular event.

In one embodiment, button 240 is programmed to correspond to an emergency call. In one embodiment, upon receiving such a call, the monitoring service is programmed to immediately summon aid. In one embodiment, the monitoring service is programmed to verify the emergency call prior to summoning aid. Verification may entail exchanging of messages using device 200 and may include signaling the user. One means of signaling the user comprises presenting a message on display 210.

In one embodiment, button 230 is programmed to correspond to user initiated calls of an intermediate nature. From the perspective of the user, such calls cannot clearly be categorized as emergency or non-emergency. Therefore, in one embodiment, the user is instructed to seek adult assistance in discerning the nature of the situation and activation of button 230 is one means of requesting such assistance.

Figure 3:
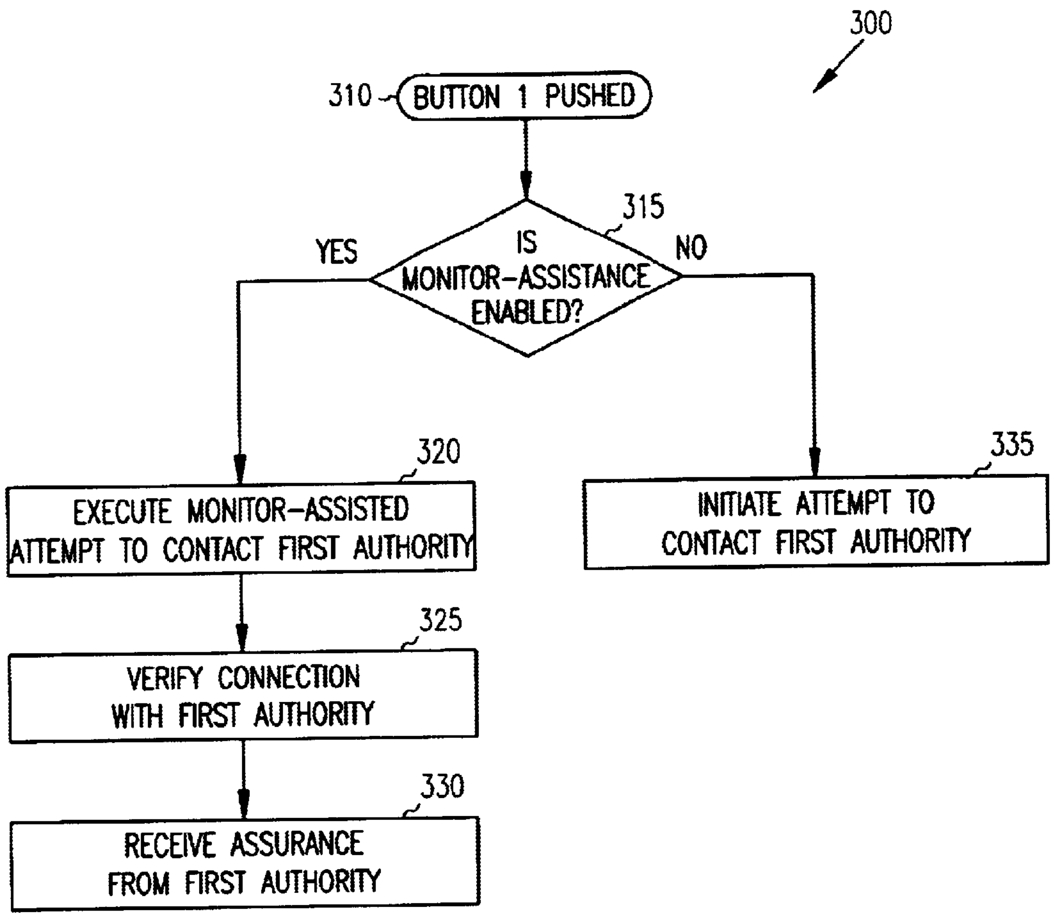
FIG. 3 is a flowchart of a portion of the method implemented by one embodiment of the present system.
Figure 4:
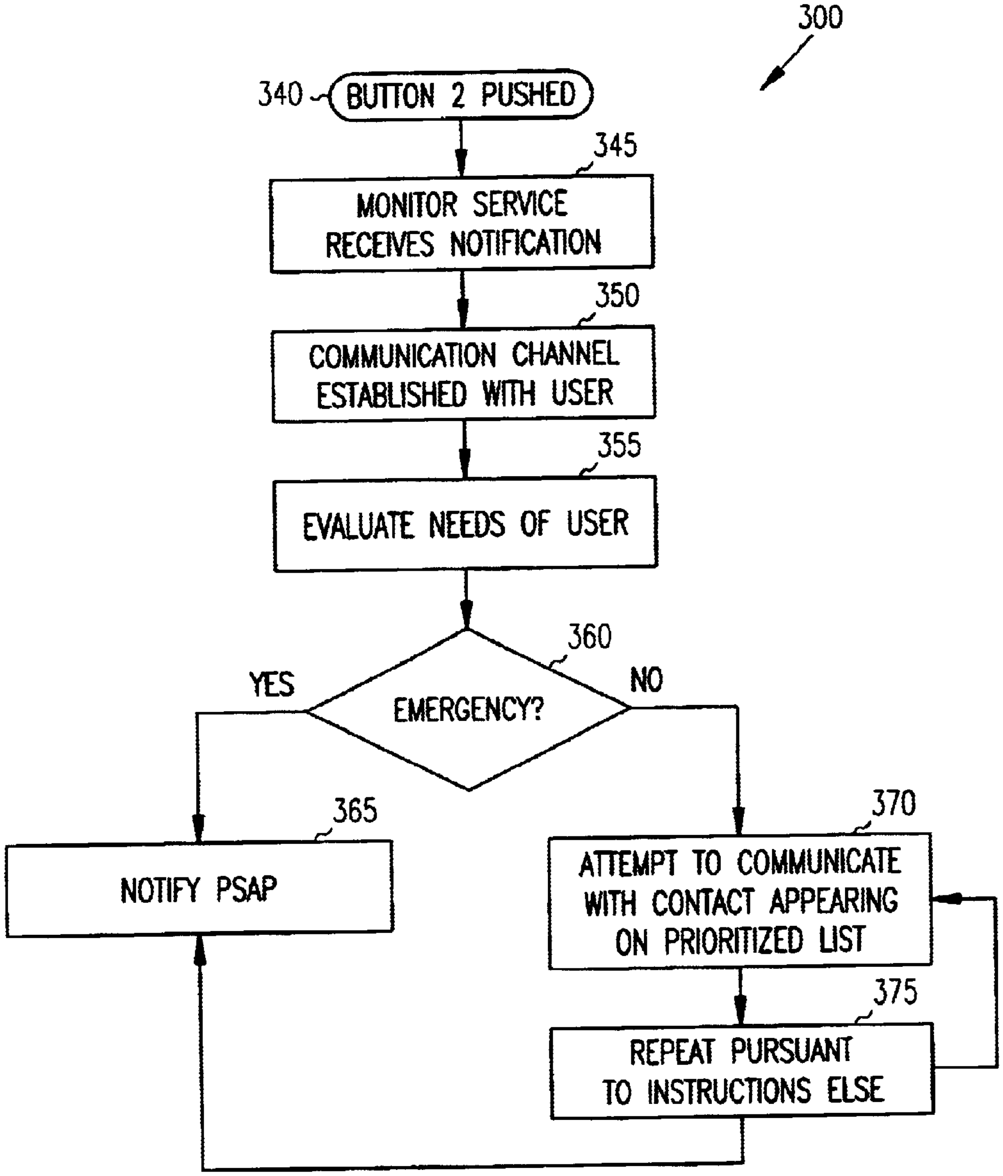
FIG. 4 is a flowchart of a portion of the method implemented by one embodiment of the present system.
Figure 5:
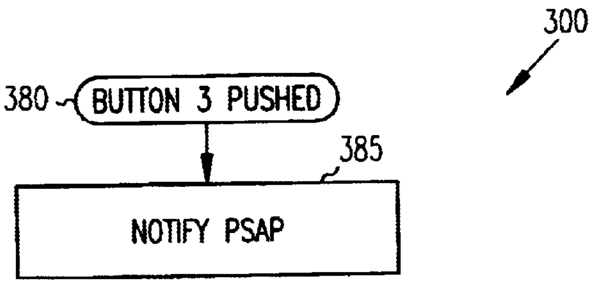
FIG. 5 is a flowchart of a portion of the method implemented by one embodiment of the present system.

FIGS. 3, 4 and 5 depict flowcharts representing portions of a method implemented by one embodiment of the present system. The flowcharts are based on an embodiment wherein the communication device has three user accessible buttons. Each of the Figures is organized according to which button is actuated by the user. The term "user" refers to the caller that is requesting assistance.

FIG. 3 depicts a portion of method 300 commencing with the pushing of a first button at 310. In one embodiment, question 315 determines whether monitor assistance is enabled. If monitoring assistance is enabled, then further processing of the call continues with the assistance of the monitor service. In one embodiment, monitor assistance entails assisting the user in establishing communications with the first authority. At 320, for example, the monitor service initiates a request to communicate with the first authority. Initiating a request may include attempting to establish communications or sending a request to communicate. In one embodiment, this may be a telephone call originated by the monitor service while the user remains available on another telephone line. In one embodiment, this may entail a two way pager call by the monitor service to the first authority while the user remains available on another communication channel. In the aforementioned embodiments, the monitor service is actively originating the connection to the first authority and the user passively awaits the connection. In one embodiment, the monitor service adopts a passive role and the user accessible communication device actively attempts to establish connection with the first authority.

At 325, one embodiment provides that the monitor service verifies a proper connection with the first authority. This may entail one or more questions posed by the monitor service to the first authority to verify that the party responding to the communication channel is actually the first authority. In the event that the party communicating on the channel is not the first authority, then the monitor service takes additional measures to communicate with the first authority. Such additional measures may include originating another telephone call, commencing two way pager communications or verbally requesting a connection with the first authority.

At 330, the monitor service receives assurances from the first authority that the obligations of the monitor service have been fulfilled. In one embodiment, such obligations may entail receiving assurances that the aid sought by the user will be met in a timely manner. In one embodiment, such obligations may entail receiving assurances that the aid requested by the user is no longer needed.

In the event that monitor assistance is not enabled, then processing proceeds to 335 wherein the system attempts to initiate a communication session with the first authority. In this embodiment, the responsibility for contacting the first authority in a timely manner lies with the system administrator. The system administrator may be the first authority, or other such person or entity, charged with the well-being of the user. In one embodiment, upon activating the first button, the device initiates a request to communicate directly with the first authority without any interaction by the monitor.

FIG. 4 depicts a portion of system 300 commencing with the actuation of button two at 340. In one embodiment, following actuation of button two, processing proceeds with the monitor service receiving notification at 345. A bidirectional communication channel is established with the user at 350. The monitor service, at 355, then attempts to evaluate the needs of the user to determine subsequent processing. In one embodiment, a determination is made as to the presence or absence of an emergency, at 360. In one embodiment, the monitor service, or an operator at the monitor service, makes this determination based on information derived from discussions with the user. If the monitor service determines that the user's situation presents an emergency, then the monitor service notifies a public safety access point ("PSAP"). The PSAP (commonly known as a 911 dispatch center) receives incoming calls for assistance and through the use of trained operators, determines the level and type of aid required for any particular situation and dispatches aid accordingly. Aid may include fire suppression equipment and personnel, police service or medical emergency personnel.

If the monitor service determines that the user's situation does not present an emergency, at 370, the monitor service attempts to establish communications with a contact appearing on a prioritized list. The prioritized list is adapted to the needs of the user includes such information as name and contact information. In one embodiment, the prioritized list includes one or more persons that have been authorized to render aid for the benefit of the user. In one embodiment, the prioritized list includes nonemergency contacts. Nonemergency contacts may include friends, relatives, or others designated by the system administrator to exercise authority over the caller or user.

In one embodiment, a list is in the form of a database. The database may include contact information relative to a guardian for the user. The information may include a variety of telephone numbers for the guardian, such as a cellular telephone number, a pager telephone number, or a office telephone number. The database may also include contact information for nonemergency contacts, including a plurality of names or a plurality of access numbers or other information. The database may be in computer readable form.

The prioritized list is utilized by the monitor service in accordance with instructions from the system administrator. For example, the system administrator may instruct that the monitor service attempt to establish communications with contacts in a specified sequential order. In another embodiment, the system administrator may instruct that multiple calls be commenced in a parallel fashion. Establishing communications may include attempting to connect using a standard telephone number and a plain old telephone system. In one embodiment, establishing communications entails originating a cellular telephone call. In one embodiment, establishing communications entails transmitting a two way pager message, a narrow band PCS message or other wireless message.

In one embodiment, the prioritized list includes a look-up table of name and telephone number information. The look-up table includes a list of names and telephone numbers for responding to the user's request. Data included in the look-up table is received prior to the time of the aid request call by the user.

In one embodiment, implementation of the present system involves the prioritized list of contacts (or "authorities" as used herein), instructions for establishing communications with the contacts appearing on the prioritized list, and authorization to contact and defer to the judgement of the enumerated authorities. The instructions provide details by which the monitor service is to render aid for the benefit of the user. In one embodiment, the monitor service renders aid to the user by summoning aid from an emergency dispatch center or other person. By way of example, the instructions may provide that on weekends, a first person is to be called concerning non-emergency situations and on weekdays, a second person is to be called. For another example, the instructions may provide that in the event of a non-emergency situation, two persons are to be called in no particular order, that is, with no priority specified. As another example, a first person is to be deemed a high priority contact and a second person is to be deemed a low priority contact. The authorization to contact and defer to the judgement of the enumerated authorities may be evidenced by a legally enforceable contract or other agreement. The contract gives rise to a legal liability to the extent that the monitor service is obligated to fulfill the duties agreed upon. This liability is discharged upon executing the system administrator's instructions in accordance with the contract. Execution of the system administrator's instructions may entail exercising judgement in evaluating the needs or request of the user. Liability shifts from the monitor service to the authorized contact after the monitor service has received assurances, from the contact, that the contact will try to resolve the situation presented by the user. In one embodiment, communications with the contact are terminated upon receiving assurances of acceptance of responsibility.

In one embodiment, the operator, at the monitor service, attempts to connect the user with a first name appearing in the look-up table. After a predetermined number of unsuccessful attempts to establish communications with the first entry in the prioritized list, one embodiment provides that the operator then proceeds to the next entry in the prioritized list and, again, attempts to contact a source of aid for the user. This process is repeated until the user's needs are satisfied. In one embodiment, calls to the entries of the look-up table are performed with the aid of a processor executing a program. In addition, the prioritized list of contacts may be received from the system administrator in computer-readable form. In one embodiment, a synthesized voice is used to convey the appropriate message to emergency personnel or to a guardian appearing in the prioritized list. In one embodiment, programming executing at a monitor service, or call center, assesses the callers circumstance or situation and selects an appropriate contact with which to establish communications.

At 375, if attempts to establish communications with a contact appearing on the prioritized list have failed, additional measures are taken according to the instructions provided by the system administrator. In one embodiment, the instructions provide that repeated attempts to establish communications continue or after a predetermined number of unsuccessful attempts, then notify the PSAP. In one embodiment, the operator at the monitor service is instructed to treat an incoming call from a user as an emergency calls unless the user is able to convincingly convey a message to the contrary.

FIG. 5 depicts a flowchart of a portion of method 300 wherein button "3" is actuated, commencing at 380. In one embodiment, button "3" is associated with an emergency and therefor, at 385, processing entails expeditiously notifying the PSAP. Notification of the PSAP, at 385, in one embodiment, entails action by the monitoring service to make the connection. In one embodiment, notification of the PSAP proceeds automatically with no required action by the monitor service.

In one embodiment of the present system, the operator first seeks verification of the need for emergency services. In one embodiment, the operator summons police, fire, or medical aid, as appropriate. Summoning police, fire or medical aid may entail placing a single call to a PSAP or it may entail contacting each service separately.

In one embodiment, when the operator at the monitor service has successfully located a source of aid for the benefit of the user, the user and the aid source are coupled directly on the same telephone line. In one embodiment, the monitoring service shuttles correspondence between the parties. In one embodiment, the aid source and the user correspond directly over the same wireless communication channel by which the monitoring service was initially contacted.

The present system provides two levels of prioritization for rendering aid. The first level of prioritization, in one embodiment, presents three discrete levels from which the user can select. The three levels correspond to the three buttons presented to the user on the device used to solicit aid. As noted above, a first button requests a connection with a parent or guardian. A second button requests a connection with a service configured to assist the user in evaluating the situation. A third button requests a connection with an emergency aid service.

The three buttons each correspond to a different priority level as determined by the user. The different priority levels may correspond to emergency or non-emergency situations. In operation, a child (the user) may select the first button, for example, to contact a parent concerning such matters as requesting permission to participate in an unplanned play activity. Here, the child is seeking permission to participate and the child defers the decision to the parent. An example suitable for the second situation, and thus, activation of the second button, arises where a child has missed a transit bus or a ride to a recreational activity. In this case, the child may reasonably expect that a person appearing on the prioritized list may be in a position to assist. Here, the child solicits the prioritized calling services offered by the monitoring service to resolve the immediate problem of transportation. An example of the third situation arises in the case of a fire emergency. The child independently makes the determination that the situation presents an emergency and immediate assistance is needed.

The second level of prioritization provided by the present system corresponds to the function of the monitor service and their use of the prioritized calling list. The call recipient at the monitor service, upon receiving an incoming call, evaluates the merits of the situation presented by the user. The call recipient may determine that the call is not an emergency and proceed to access the entries appearing on the prioritized list of contacts. The call recipient may determine that the call is an emergency and thus, contact a PSAP or emergency dispatch center. This second level of prioritization applies to operation of the second button of the present system.

Additional gradations of priority are also comprehended. In various embodiments, the user may select from two buttons or four, five or six or more buttons in determining the gradation of priority. The monitor service may have access to more than one prioritized list of contacts. The monitor service may have two, three, or more, lists of contacts organized in any manner. For example, the system administrator may elect to provide instructions with a prioritized list concerning school-related events and instructions with a prioritized list concerning non-school related events. As another example, the monitor service may have access to lists concerning school-related events, choir-related events, neighborhood-related events and soccer-related events. In this case, the instructions may call for the monitor service to make a determination as to the nature of the event or situation and then implement the instructions accordingly.

Alternative Embodiments

In addition to the foregoing embodiments, various alternatives are also contemplated. For example, a signal may be received from a device such as a security system or from a sensor. The signal may be transmitted wirelessly or by a wired network. The signal may be generated and transmitted automatically or upon operation by an individual. For example, a neighbor may call the monitoring center of the present embodiment using a telephone, cellular telephone, radio communication device, or other device.

The signal is received by the monitoring center and may include information as to the urgency of the call. The call may relate to a life threatening, or property endangering hazard, or it may simply be a question. The monitoring center, using the previously provided contacts for the monitored person, then selects a contact based on information received with the call, and attempts to provide an answer to the question. The monitored person may be a child simply asking for permission to play at a friend's house. Permission to play would likely be classified as a low urgency matter whereas a life threatening situation would be classified as a high urgency matter.

Classification as to the urgency of the call may be conducted by the caller (or signal generator) or by the receiver (which may be the monitoring center operator). The caller may expressly state the urgency of the situation presented, or it may be that the operator can elicit this information from the caller. In the case of a sensor generating a signal, the sensor signal itself may convey the urgency of the situation.

The signal transmitted to the central monitoring station may include information regarding a location. The location may relate to the site of a fire, crime, or medical emergency. The location information may relate to the location of the caller. The location information may be generated by global positioning technology using satellite based signals, or it may be derived from terrestrial signal generators.

If the signal arriving at the central monitoring station is generated by a sensor, the operator at the station may opt to attempt to call the monitored person. The monitored person may be accessible using a cellular telephone, one way or two way pager, or by a radio communication link. The monitored person may also be available by e-mail or instant messaging using the Internet. The operator may choose to establish bidirectional communication with the monitored person for purposes of verifying the call, establishing a condition and determining the urgency of the situation.

The plurality of contacts for a person may include home and work telephone numbers, pager telephone numbers, cellular telephone numbers, pager codes, radio frequencies, e-mail addresses, or other alphanumeric codes that allow the operator to establish a communication link. The link provides a communication channel by which the operator can obtain instructions for dealing with the situation presented by the received signal, or delegate responsibility. For example, if a contact is a parent, then the parent may opt to directly contact the monitored person and provide instructions or take responsibility for a situation presented by the monitored person.

The plurality of contact numbers allows an operator to iteratively pursue communications with an authority. If a first authority is unreachable at a particular number, then the operator may attempt to contact the first authority using a second number. After exhausting all efforts to reach the first contact, the instructions provided for monitoring of the person may prescribe that communications with a second contact be attempted. Again, several numbers may have been provided for this purpose and the operator may be under instructions to serially attempt to communicate using each number.

In the event that an authority cannot be reached using the contact information provided, then, where prudent, the operator may opt to contact a public safety answering point (PSAP). The PSAP, often referred to as a 911 center, will then dispatch appropriate emergency service providers.

In one embodiment, the present subject matter includes receiving a communication from a monitored person that is unable to discern the urgency of a matter. The monitoring service exercises discretion and determines the urgency of the matter. If the urgency is of a first level, then the monitoring service attempts to reach a contact for the monitored person. If unable to reach a contact, then the monitoring service terminates efforts when the contact list is exhausted. If the urgency is of a second level, calls are placed to the contact list, as before, and when the list is exhausted, then a call is placed to a public safety answering point. If the urgency is of a third level, then the monitoring service immediately contacts the public safety answering point.

Communicating with those on the contact list may include sending a cellular message, placing a cellular telephone call, sending a pager message with request for reply, sending an e-mail, or sending any other message with a request for a reply.

CONCLUSION

Other embodiments are possible and the examples provided herein are intended to be demonstrative and not exclusive or exhaustive of the present invention, which is determined by the scope of the appended claims and the full range of equivalents to which they are entitled.

What is claimed is:

1. A method comprising:

receiving a request, the request having an urgency, for assistance at a remote location from a monitored person unable to classify the urgency of the request;

classifying the urgency based on information received with the request;

if the urgency of the request is of a first classification, then attempting to establish bidirectional communication with a first contact selected from a plurality of contacts for the monitored person;

if the urgency of the request is of the first classification, and if the attempt to establish bidirectional communication with the first contact is unsuccessful, then attempting to establish bidirectional communication with a second contact selected from the plurality of contacts;

if the urgency of the request is of a second classification, then attempting to establish bidirectional communication with the first contact;

if the urgency of the request is of the second classification, and if the attempt to establish bidirectional communication with the first contact is unsuccessful, then attempting to establish bidirectional communication with a second contact selected from the plurality of contacts;

if the urgency of the request is of the second classification, and if the attempt to establish bidirectional communication with the first contact is unsuccessful, and if the attempt to establish bidirectional communication with the second contact is unsuccessful, then contacting a public safety answering point; and if the urgency of the request is of a third classification, then contacting the public safety answering point.

2. The method of claim 1 wherein receiving a request for assistance includes receiving a telephone call.

3. The method of claim 1 wherein receiving a request for assistance includes receiving a telephone call from the monitored person.

4. The method of claim 1 wherein receiving a request for assistance includes receiving a signal from a security system.

5. The method of claim 1 wherein receiving a request for assistance includes receiving a signal from a sensor.

6. The method of claim 1 wherein receiving a request for assistance includes receiving location information for the monitored person.

7. The method of claim 1 wherein classifying the urgency includes classifying the urgency as an emergency.

8. The method of claim 1 wherein attempting to establish bidirectional communication includes originating a telephone call.

9. The method of claim 1 wherein attempting to establish bidirectional communication includes originating a cellular telephone call.

10. The method of claim 1 wherein attempting to establish bidirectional communication includes transmitting a wireless signal.

11. The method of claim 1 wherein attempting to establish bidirectional communication includes transmitting a pager signal.

12. The method of claim 1 wherein attempting to establish bidirectional communication includes transmitting an e-mail message.

13. The method of claim 1 wherein contacting a public safety answering point includes dialing a telephone number.

14. A method comprising:

receiving a plurality of contact numbers for each of a plurality of dependents, each of the dependents located at a different place and each contact number associated with an authority for a dependent;

receiving a message of benefit to a particular dependent selected from the plurality of dependents, the message received at a location remote from the particular dependent;

determining a priority of the message;

if the message is of a low priority, then attempting to obtain instructions using a contact number selected from the plurality of contact numbers for the particular dependent;

if the message is of a medium priority, then attempting to obtain instructions using a contact number selected from the plurality of contact numbers for the particular dependent;

if the message is of the medium priority and if unable to obtain instructions, then reporting the message to a public safety answering point; and if the message is of a high priority, then reporting the message to the public safety answering point.

15. The method of claim 14 further comprising establishing bidirectional communication with the particular dependent.

16. The method of claim 14 wherein receiving a plurality of contact numbers includes receiving telephone numbers.

17. The method of claim 14 wherein receiving a plurality of contact numbers for each of a plurality of dependents includes receiving a first contact number associated with a first authority for the particular dependent and receiving a second contact number associated with a second authority for the particular dependent.

18. The method of claim 14 wherein receiving a message of benefit to a particular dependent includes receiving an alarm signal.

19. The method of claim 14 wherein receiving a message of benefit to a particular dependent includes receiving a telephone call.

20. The method of claim 14 wherein determining a priority of the message includes decoding the message.

21. The method of claim 14 wherein determining a priority of the message includes communicating with the particular dependent.

22. The method of claim 14 wherein attempting to obtain instructions includes attempting to establish bidirectional communication using a contact number.

23. The method of claim 14 wherein attempting to obtain instructions includes attempting to delegate responsibility.

24. The method of claim 14 wherein reporting the message to a public safety answering point includes dialing a telephone number;.

25. The method of claim 14 wherein attempting to obtain instructions includes transmitting a wireless signal.

26. The method of claim 14 wherein attempting to obtain instructions includes transmitting a pager signal.

27. The method of claim 14 wherein attempting to obtain instructions includes transmitting an e-mail message.

28. The method of claim 14 wherein contacting a public safety answering point includes dialing a telephone number.

* * * * *